(No Model.) 6 Sheets—Sheet 1.
E. BOCKMÜHL & W. KARTHAUS.
MACHINE FOR THE MANUFACTURE OF PAPER BARS.
No. 461,732. Patented Oct. 20, 1891.
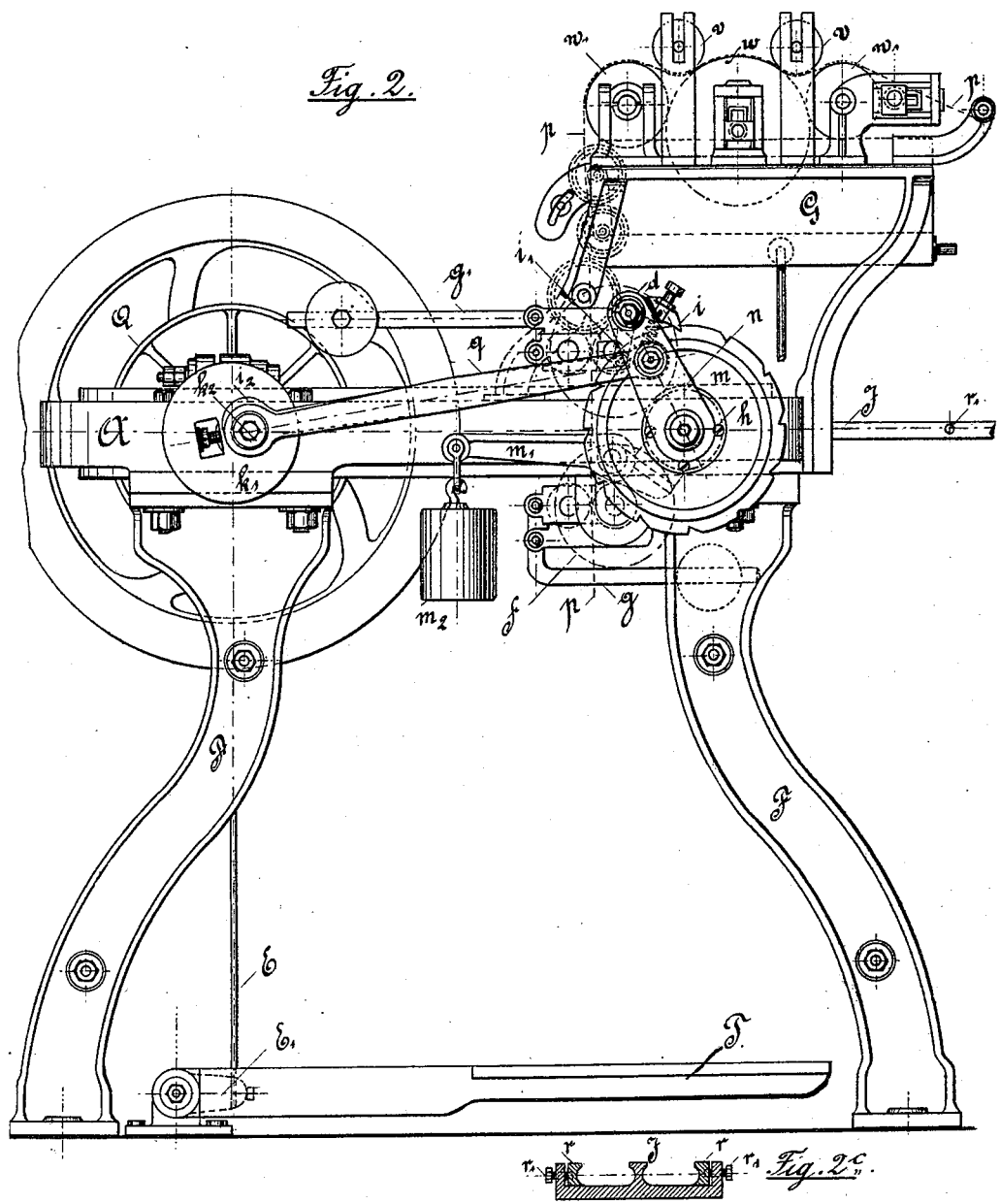
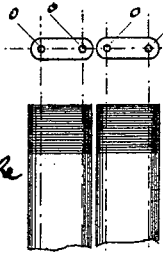
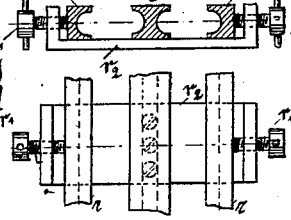

(No Model.) 6 Sheets—Sheet 2.
E. BOCKMÜHL & W. KARTHAUS.
MACHINE FOR THE MANUFACTURE OF PAPER BARS.
No. 461,732. Patented Oct. 20, 1891.
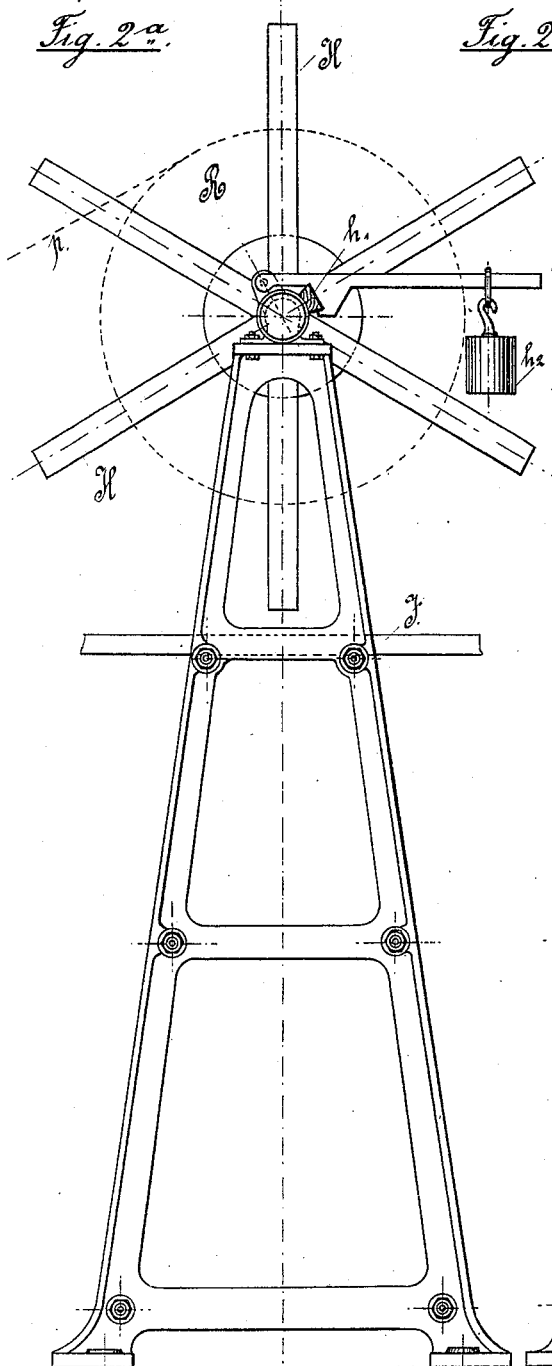
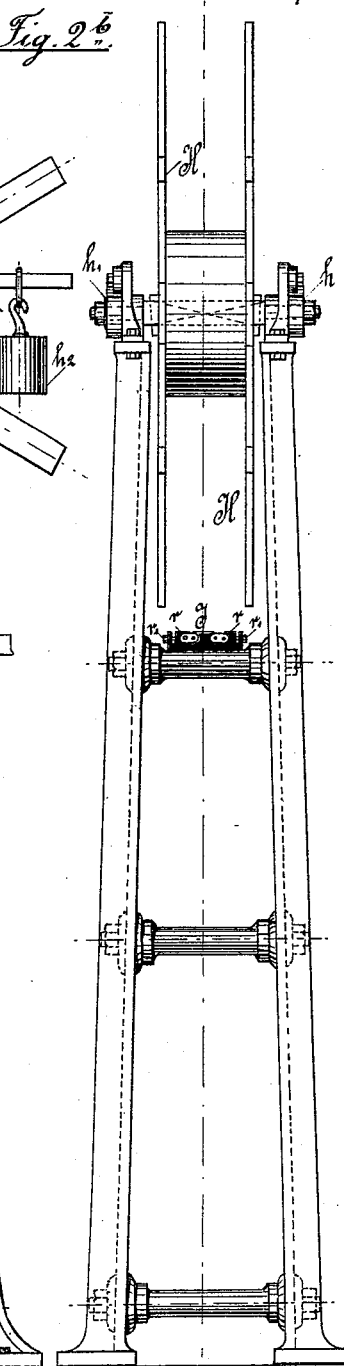
Fig. 2ª. Fig. 2ᵇ.

(No Model.) 6 Sheets—Sheet 3.

E. BOCKMÜHL & W. KARTHAUS.
MACHINE FOR THE MANUFACTURE OF PAPER BARS.

No. 461,732. Patented Oct. 20, 1891.

Witnesses:
Wm. Goodwin
Rudolph Fricke

Inventors:
Ernst Bockmühl
Wilhelm Karthaus (No Model.) 6 Sheets—Sheet 4.
E. BOCKMÜHL & W. KARTHAUS.
MACHINE FOR THE MANUFACTURE OF PAPER BARS.
No. 461,732. Patented Oct. 20, 1891.
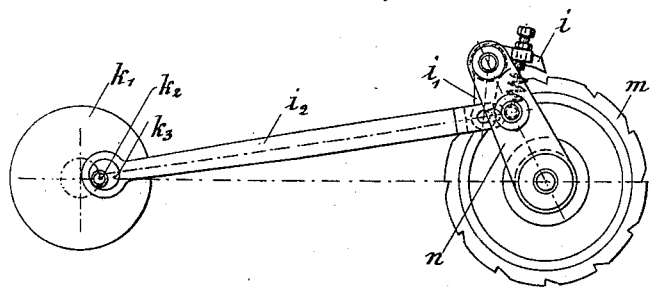
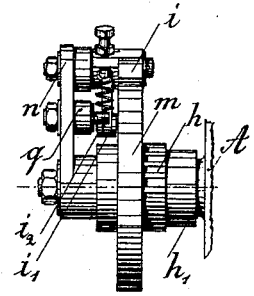
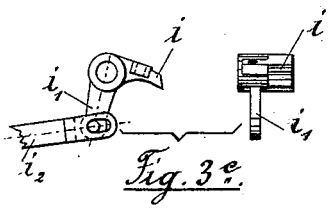
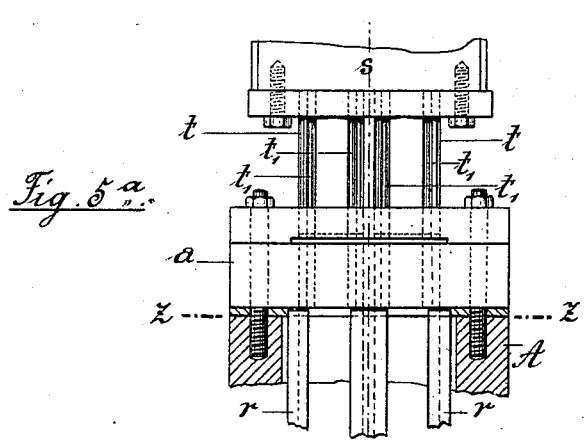
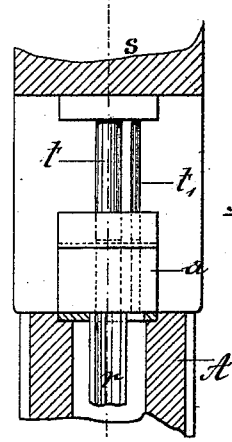
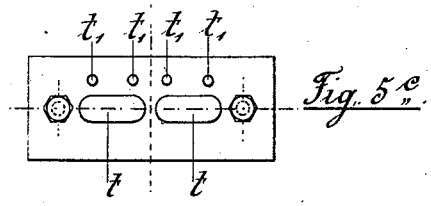
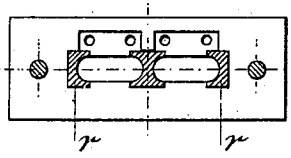
Witnesses
William Miller
Edward Wolff
Inventors
Ernst Bockmühl
Wilhelm Karthaus
by Van Santvoord & Hauff
their att'ys

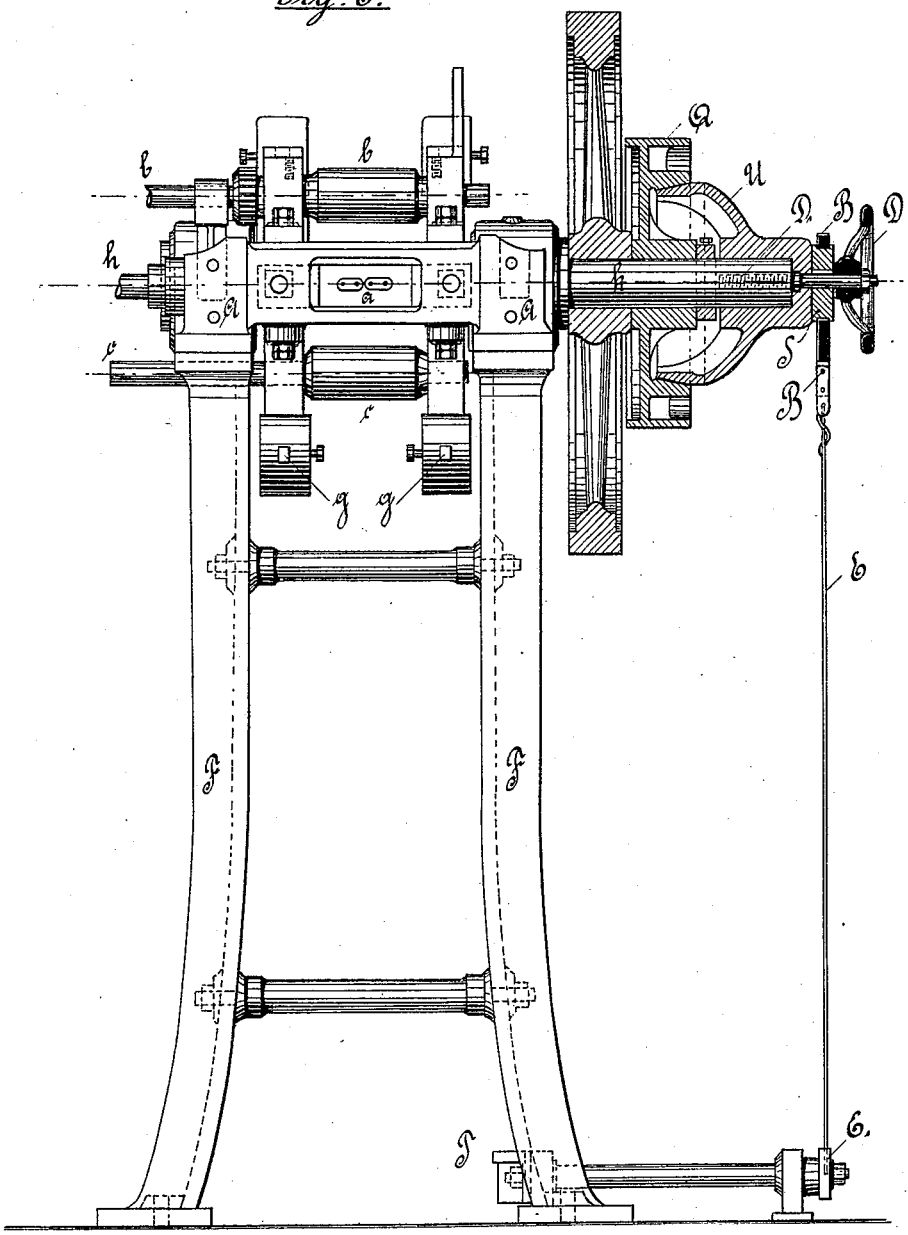

(No Model.) 6 Sheets—Sheet 6.
E. BOCKMÜHL & W. KARTHAUS.
MACHINE FOR THE MANUFACTURE OF PAPER BARS.
No. 461,732. Patented Oct. 20, 1891.

UNITED STATES PATENT OFFICE.

ERNST BOCKMÜHL AND WILHELM KARTHAUS, OF BARMEN RITTERSHAUSEN, GERMANY.

MACHINE FOR THE MANUFACTURE OF PAPER BARS.

SPECIFICATION forming part of Letters Patent No. 461,732, dated October 20, 1891.

Application filed April 20, 1891. Serial No. 389,720½. (No model.)

*To all whom it may concern:*

Be it known that we, ERNST BOCKMÜHL and WILHELM KARTHAUS, subjects of the King of Prussia, residing at Barmen Rittershausen, in the Kingdom of Prussia and German Empire, have invented new and useful Improvements in Machines for the Manufacture of Paper Bars, of which the following is a specification.

The machine forming the object of this invention accomplishes the manufacture of bars, rods, moldings, and the like, which consist of separate layers of papers having the same form and which are secured one to the other by a suitable adhesive. The form of the several paper layers thus corresponds to the cross-section of the bar or mold to be formed. The machine operates in such a way as to automatically accomplish the cutting of the paper layers, the pasting together of the same, and also the pressing after the pasting, so as to attain a firm cohesion.

Figure 3:
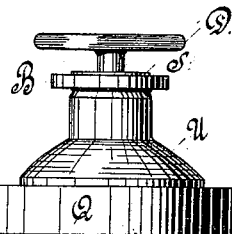
Figure 4:
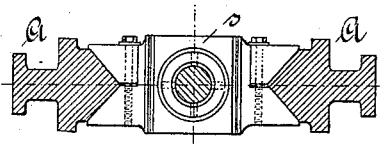
Figure 5:
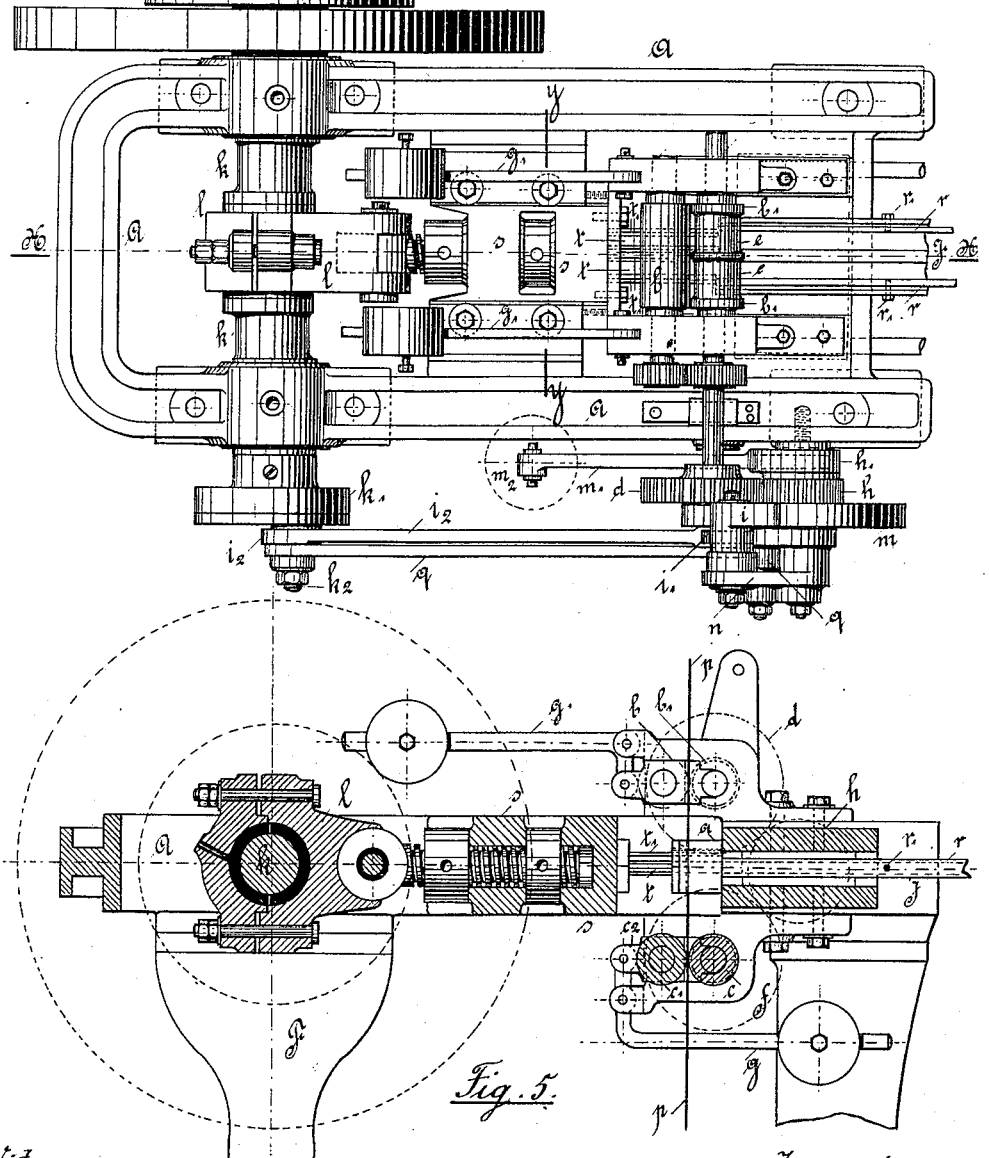
Figure 7:
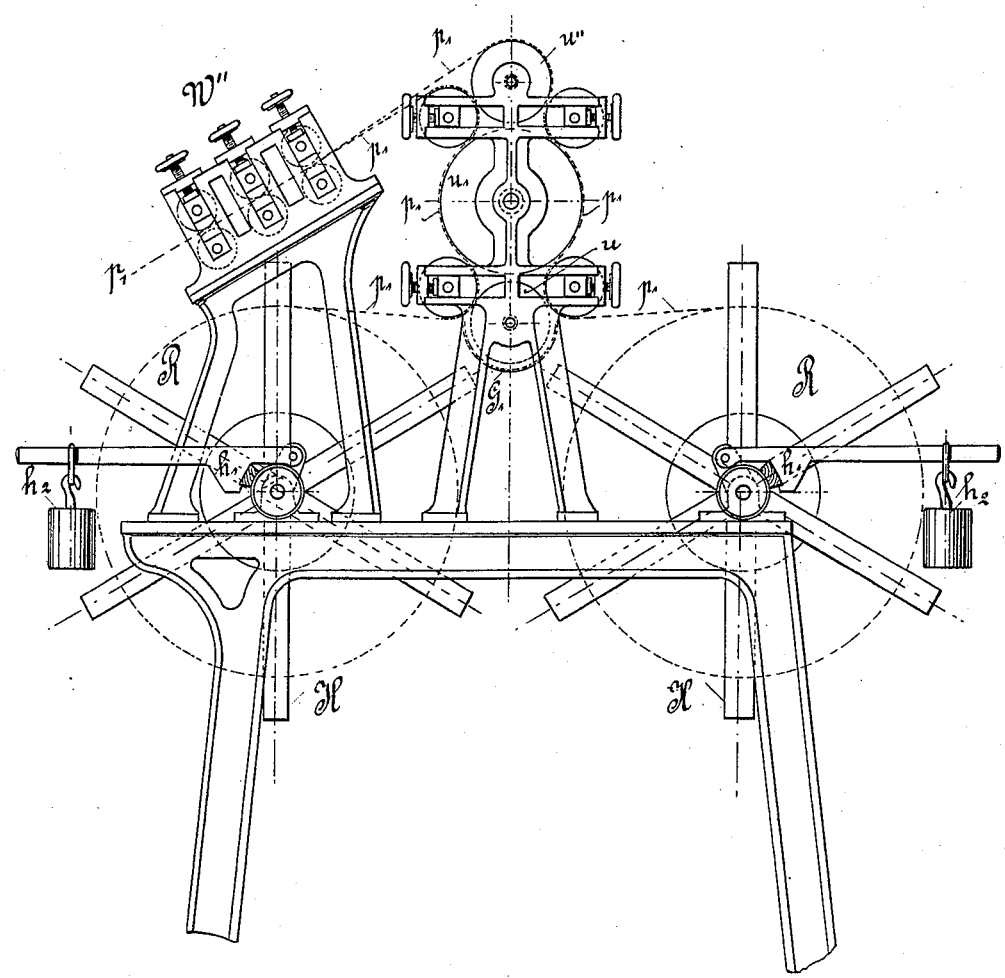

In the drawings, Figure 1 shows an end view and a plan view of a pair of bars made on the machine. Fig. 2 is a side elevation of the machine. Figs. $2^c$ and $2^d$ show enlarged views of the channels through which the rods are pressed. Figs. $2^a$ and $2^b$ show a side and end elevation of a reel with a roll from which the paper strip is fed to the machine. Fig. 3 is a plan view of the machine. Fig. $3^a$ is a detail side view of the adjusting device used in feeding the strip. Fig. $3^b$ is an edge view of Fig. $3^a$. Fig. $3^c$ is a detail side and end view of the pawl shown in Fig. $3^a$. Fig. 4 is a section along $y\,y$, Fig. 3. Fig. 5 is a section along $x\,x$, Fig. 3. Fig. $5^a$ is a detail plan view of the dies. Fig. $5^b$ is a longitudinal section of Fig. $5^a$. Fig. $5^c$ is an end view of the male die. Fig. $5^d$ is a section along $z\,z$, Fig. $5^c$. Fig. 6 is an end elevation of the machine, partly in section. Fig. 7 shows a double reel having two paper strips and a pasting apparatus.

The machine shown in the drawings prepares at one and the same time two rods or bars, Fig. 1, of oblong form in cross-section, which throughout their length are each provided with two holes $o$ and from which equal parts are afterward separated or taken off, which equal parts can then be used as links or lamellæ for paper belts, as set forth in United States Letters Patent No. 372,297, of November 1, 1887. The paper to be operated on is placed in strips of suitable width in a roll R upon the reel H, Figs. $2^a$ and $2^b$, placed behind the machine, and from thence the strip $p$ passes through a paste apparatus G, Fig. 2, over the machine, and then after being provided on one side with paste or adhesive the strip is fed intermittently or step by step downward into a double die, which every time the strip stands still cuts two layers from the paper and presses them out of the female dies into the double channel I. (Shown on enlarged scale in Figs. $2^c$ and $2^d$.) In this channel the paper layers are pushed along as the work progresses. The male and female dies are shown enlarged in Figs. $5^a$, $5^b$, $5^c$, and $5^d$. The female die $a$ is secured by two screws at the end of the frame A, facing the slide $s$, Figs. 3 and 5. The female die consists of two parts, between which is a slot for the passage of the paper strip. The male dies $t\,t'$, secured to slide $s$, are guided in the front or forward part of the female die. As two bars are being formed simultaneously, two male dies $t$ and four male dies $t'$ are required. The frame A is supported on the legs F. The slide $s$ is guided in frame A, Figs. 3, 4, and 5, and is reciprocated by the link $l$, actuated by crank-shaft $k$. The male dies $t\,t'$ are secured to the slide $s$, and, as already stated, said male dies enter the female die $a$. Against the rear of the female die $a$ abuts the end of channel I, so that the two divisions of channel I form an exact continuation of the two perforations or passage-openings of the female die. The two round dies $t'$ over each main die $t$ serve to form the holes $o$, Fig. 1. The paper strip $p$, coming from the paste apparatus, is taken by two rollers $b\,b'$, Figs. 3 and 5. The roller $b'$ has indentations $e\,e$, so that the adhesive on the paper strip cannot be transferred to the roller. From the rollers $b\,b'$ the strip passes into a narrow cut or channel in the female die $a$, Figs. 5 and $5^a$, so as to come in front of the male dies $t\,t'$, and passes thence to a second pair of rollers $c\,c'$. The roller $c'$ is journaled in movable bearings, and is pressed by weighted lever $g$ firmly against roller $c$, the roller $b$ being similarly pressed against $b'$ by weighted lever $g'$. In order to advance the strip, the journals of the fixed rollers $b'$ and $c$ are provided with toothed wheels $d$ and $f$, Figs. 2 and 5, which receive motion in common from the toothed wheel $h$, which latter is rotated intermittently corresponding to the step-by-step or intermittent motion of the strip. This rotation is accomplished by the mechanism illustrated in Figs. 2, 3, $3^a$, $3^b$, and $3^c$. The wheel $h$ is connected with a ratchet or disk $m$, engaged by a pawl $i$ on lever $n$, rotatably mounted on the shaft of disk $m$. The lever $n$ is oscillated by link $q$ and crank-disk $k'$, so that at each rotation of shaft $k$ the disk $m$ is engaged by pawl $i$ and rotated to the proper degree. On the return of lever $n$ and pawl $i$ the disk $m$ remains at rest, and during this interval of rest dies $t$ $t'$ come into action. The dies $t'$, as already noticed, form the holes $o$, and of course the paper strip must advance at each step a distance equal to the distance between dies $t$ and dies $t'$, so that after the dies $t'$ have punched the holes $o$ into the strip the latter is advanced such a distance that the holes $o$ come to rest on the center portion of die $t$. The die $t$ then punches out a layer, as seen in Fig. 1, and presses the layer into channel I.

In order to firmly hold the ratchet $m$ after each step and to accurately limit the advance of the rollers $b$ $b'$ $c$ $c'$, actuated by ratchet $m$, the latter is exposed to the action of a brake-lever $m'$, Figs. 2 and 3, which, by a weight $m^2$, forces a brake-block against a brake-disk $h'$, connected to the ratchet or disk $m$. The partial revolution of the disk $m$ can be regulated by adjusting the lift or crank motion at the crank-disk $k'$. When the crank-disk has assumed a certain position after each revolution, the ratchet $m$ can be adjusted by the pawl $i$, whose arm $i'$ is connected by link $i^2$, Figs. 3 and $3^a$, with the eccentric part $k^3$ of the pin $k^2$. The link $i^2$ has a slotted connection with $i$, so that when the link $i^2$ is oscillated through the rotation of $k^2$ by the crank-disk $k'$ said link has a certain lost motion as regards $i'$. Only at the extreme end of the throw, Fig. $3^a$, does the link $i^2$ act on arm $i'$ and lift the pawl $i$ out of engagement with the ratchet or disk $m$. When upon a further rotation the link $i^2$ recedes, the pawl is forced by a spring into engagement with ratchet $m$, said spring being connected at one end to a set-screw on the pawl and at the other end to a stud on lever $n$. The object of connecting the pawl with the pin $k^2$, to which pin is also connected the link $q$ of lever $n$, is to lift the pawl out of engagement before the lever $n$ has reached the end of its stroke. Thereby the disk $m$ is always caused to stop at the same moment—that is, it always makes the same rotation—which advances the paper strip a distance equal to the distance between the centers of dies $t'$ and $t$. At each rotation of the crank-shaft $k$ there thus results a disengagement of the pawl with the ratchet $m$ and a standing still of the latter at exactly the same periods of time, whereby the requisite and absolutely equal advancement of the paper strip is accomplished. The pieces punched out of the strip pass, one after another, out of the openings in die $a$ into the divisions of channel I. The divisions of channel I are arranged so that they can be narrowed in order to expose the paper pieces or sections to pressure as the work advances, whereby a firm connection of the several layers by means of the interposed adhesive is attained. When the paper layers or sections reach the narrower part of the division, they are of course retarded, and their advance can only be accomplished by exerting a certain pressure, the degree of which depends on the extent of narrowing. This pressure is exerted by the male dies $t$ at each forward stroke, so that each paper layer as it is punched out is firmly pressed with its gummed side against the previously-punched layer, whereby all the layers advance in the channel for the thickness of a paper layer. In order to be able to narrow the divisions of the channel I, one side $r$ of each division is made adjustable, Figs. $2^c$ and $2^d$, by means of screws $r'$. The paper layers advancing in the channel can thus be clamped to any degree required, so that, according to the degree of clamping, the advance of the paper layers by the male dies or punches will subject the layers to very high pressure. The layers remain under pressure until the narrower parts of the channel-divisions are passed; but during this period the uniting-adhesive has become thoroughly dry and hard, so that a firm cohering bar emerges from the mouth of the channel. In order to prevent the compressed layers from touching with their lower edges the walls or housing of the channel and to avoid an adhesion to said housing by means of the expressed gum in case the machine is stopped, the sides $r$ are mounted on a cross-piece $r^2$, Fig. $2^d$, supporting the screws $r'$.

The machine is driven by pulley Q, Fig. 6, in connection with a friction-clutch U, Figs. 3 and 6. This clutch can be adjusted on shaft $k$ by means of a hand-wheel D and screw D'. When the clutch is in its engaging position, the shaft $k$ partakes of the rotation of the pulley Q, the clutch being brought into engagement by being pressed with its conical part into the corresponding recess in pulley Q. By holding the hand-wheel D rotating with shaft $k$ the screw D' is moved outward in said shaft $k$, taking with it the clutch U, so that the machine is at once stopped. If the attendant happens to be away from wheel D—as, for example, when he is watching the rods advancing in the channel I—he can stop the machine by the treadle T on lever E'. The screw D' of the hand-wheel has a disk S, Fig. 6, about which is placed a brake-band B, connected by a link E with the lever E'. By depressing the treadle T and lever E' the brake-band B is tightened on the disk S, so as to stop the wheel D and screw D' and arrest the machine. The paste apparatus G for supplying the strip $p$ with paste is arranged above the machine and contains the adhesive in a vessel heated by steam, into which vessel dips the paste-roller $w$. The latter in its rotation transfers paste to the under side of the paper strip $p$, passing over the roller $w'$ and under the rollers $v$. To keep the paper strip under certain tension, the shaft of reel H is subjected to the action of a weighted brake $h'\, h$, Figs. 2$^a$ and 2$^b$. The machine can also be used for operating two strips previously pasted together. In this case, in place of the single reel, there is employed the apparatus shown in Fig. 7. Here are provided two paper-rolls R, from each of which a strip $p'$ is fed into the paste apparatus G'. Both strips receive paste on one side from the roller $u$.

In order to properly distribute the paste or adhesive upon the contact-faces of the two strips $p'\, p'$, the strips pass into contact with the rollers $u'\, u''$ and move along or about said rollers in a step-by-step motion, as already set forth. The brake devices $h'\, h^2$ keep the strips under tension. The rollers $u\, u'\, u''$ can be rotated in any well-known suitable way. For example, one of said rollers may be rotated by a belt or other connection (not shown) extending to the main shaft of the machine, and said rollers may transmit motion to the other roller by gears. (Not shown.) The rotation of the rollers $u\, u'\, u''$ in connection with the progressive movement of the strips $p'\, p'$ will cause the roller $u$ to apply paste to the strips and the rollers $u'\, u''$ to distribute the paste on the strips, so that on coming together in the rollers W the strips will adhere to one another. If desirable, the roller $u$, instead of supplying the strips with adhesives, can be made to supply the roller $u$ with adhesives, and said roller $u$ can then supply the adhesives to the strips, after which the roller $u''$ will distribute the adhesives to the strip. Should the layer of paste on the side of one strip be somewhat thicker than that of the other, such difference is immaterial, since the strips are subsequently pressed together with their pasted sides in contact. On the strips leaving the apparatus the pasted sides come together. Before passing to the paste apparatus of the machine the strips pass between a heated set of rollers W'', so as to be pressed and united. The two paper strips now form a double layer, of uniform thickness, of which in the operation of the machine an equal number is always contained in a given length of bar, while in the use of a single strip, in consequence of the portions of unequal thickness, the number of layers in a given length may vary at different places along the bar. After leaving the rollers W'' the compound strip passes to the pasting device (shown in Fig. 2) and is operated on in the same manner as the single strip $p$ of Fig. 2.

If moldings are to be formed in the machine, correspondingly-shaped punches and dies, as also a correspondingly-shaped channel, must be inserted into the machine. The moldings can be used for various purposes—as, for example, for panels, picture-frames, and the like.

To prevent the weight of lever T from acting on the brake-band B, said lever can be provided with a counter-weight or spring. (Not shown.) The double strip, Fig. 7, as already noticed, is reduced to a uniform thickness throughout in consequence of the pressure received in the roller mechanism W. These rollers can be set any suitable distance apart by means of set-screws.

What we claim as new, and desire to secure by Letters Patent, is—

1. In a machine for making bars, moldings, and the like from cohering paper layers, the combination, with mechanism, substantially as described, for intermittently feeding a paper strip and supplying one side thereof with adhesive, of a pressing and punching mechanism and a channel for receiving the layers from the punching mechanism, said channel being made of such size as to clamp the layers and retain them under pressure as they are forced from the die, so as to cause the layers to cohere and to form a bar or molding, substantially as described.

2. The combination, with a pressing and punching mechanism for punching layers or pieces from a paper strip, and a channel for receiving the punched-out pieces, of a pair of feed-rollers $b\, b'$, located above the punch, a pair of feed-rollers $c\, c'$, located below the punch, a ratchet or disk $m$ for actuating the feed-rollers, and a crank-shaft for intermittently rotating the disk $m$ and for actuating the punch, the pawl $i$, lever $n$, link $g$, and crank-disk $k'$ for conveying motion from the crank-shaft to the disk, and a link $i^2$, and eccentric $k^3$ for lifting the pawl out of action, substantially as described.

3. The combination, with a pressing and punching mechanism for punching layers or pieces from a paper strip, a channel for receiving the punched-out pieces, and mechanism, substantially as described, for intermittently feeding the strip, of a paste-tank G, a paste-roller $w$, actuated by the machine distributing-rollers $w'$, and press-rollers $v$ for pressing the strip against the paste-roller and distributing-rollers, substantially as described.

4. The combination, with a paste apparatus G, having pasting, distributing, and pressing rollers, and a paste apparatus G' for pasting two strips of paper, provided with a pasting-roller $u$, distributing-rollers $u'\, u''$, and pressure-rollers W'' for giving uniform thickness to the compound strip, of a pressing and punching mechanism, a channel for receiving the layers from the punching mechanism, said channel being made of such size as to clamp the layers and retain them under pressure, and mechanism, substantially as described, for intermittently feeding the strip.

In testimony whereof we have hereunto set our hands in the presence of two subscribing witnesses.

ERNST BOCKMÜHL.
WILHELM KARTHAUS.

Witnesses:
WM. ESSEMREIN,
RUDOLPH FRICKE.